United States Patent Office 3,496,277
Patented Feb. 17, 1970

3,496,277
FUNGICIDAL METHODS AND COMPOSITIONS EMPLOYING PENTAHALOCYCLOPENTADIENYLAMINES
Earl T. McBee, 420 Forest Hill Drive,
Lafayette, Ind. 47906
No Drawing. Original application Dec. 16, 1963, Ser. No. 330,604, now Patent No. 3,356,725, dated Dec. 5, 1967. Divided and this application Nov. 23, 1966, Ser. No. 611,495
Int. Cl. A01n 9/20
U.S. Cl. 424—325   2 Claims

---

ABSTRACT OF THE DISCLOSURE

Pentahalocyclopentadieneamines are disclosed to be new compounds useful for controlling fungal growth on plants. Also disclosed are fungicidal compositions containing such compounds and methods for manufacturing of the pentahalocyclopentadieneamines.

---

This is a division of my patent application identified by United States Ser. No. 330,604, filed Dec. 16, 1963, now U.S. Patent No. 3,356,725, which is a continuation-in-part of S.N. 98,029, filed Mar. 24, 1961, now abandoned.

This invention relates to pentahalocyclopentadienylamines, especially pentachlorocyclopentadienylamines.

The invention sought to be patented, in its composition aspect, resides in the concept of a chemical compound having pentahalocyclopentadiene moiety bearing an amino substituent whose nitrogen atom is bound to at least one hydrogen atom and halo is chloro or bromo.

The invention sought to be patented, in its process aspect, resides in the concept of embodying such compositions in tangible form by contacting hexahalocyclopentadiene, preferably hexachlorocyclopentadiene with ammonia or a primary amine, preferably in the presence of a non-reactive organic solvent.

The tangible embodiments of this invention are colorless crystalline solids usually melting upwards of 50 degrees centigrade. They are useful as chemical intermediates by virtue of the reactive hydrogen atom of the amino group and the unsaturation characteristic of cyclopentadienes which render this class of compounds generally useful in polymerizations, co-polymerizations and Diels-Alder type condensations with reactive dienophiles. They are particularly efficacious in protecting crops, especially fructiferous plants and trees, against fungi, e.g., *Sclerotium rolfsil* and *Alternaria solani*, and bacteria such as *Pseudomonas phaseolicola, Erwinia amylovora* and *Xanthomonas phaseoli*, e.g., by spraying on the plant as a 0.001 to 0.5 percent aqueous dispersion. They are useful as additives for fuel and lubricating oils in the obvious sense of rendering ordinary hydrocarbon oils more efficacious as fuel oils and lubricating oils. They can be incorporated in small amounts, e.g., 5 parts per weight, in gasoline and other motor fuels which contain tetraethyl lead to suppress pre-ignition firing.

The compounds of this invention have the formula $C_5X_6NHR$ wherein $C_5X_6$ is the pentahalocyclopentadiene moiety, preferably the pentachlorocyclopentadiene moiety, and R is hydrogen or an alkyl, cycloalkyl, aryl, alkaryl or aralkyl group, having a molecular weight below 300 and preferably hydrocarbonaceous, in which aryl contains 6 to 20, preferably 6 to 10, carbon atoms, but additionally can contain an oxygen, nitrogen or sulfur hetero ring atom but is preferably carbocyclic and most preferably monocarbocyclic and in which alkyl contains from 1 to 20 carbon atoms, preferably 1 to 6, cycloalkyl contains from 3 to 8 carbon atoms, and each can bear simple substituents, preferably not greater than three and more preferably no more than one, e.g., hydroxy, chloro, bromo, fluoro, iodo, sulfato, nitro, trifluoromethyl, lower-alkoxy, lower-acyloxy, amino, aldehydo, ketal, acetal, carboxy, carbalkoxy, carbamyl, carbamyloxy, etc. Representative R groups are methyl, propyl, ethyl, butyl, amyl, hexyl, heptyl, octyl, dodecyl, eicosyl, phenyl, o-tolyl, m-tolyl, ethyl-phenyl, benzyl, o-chlorobenzyl, phenethyl, α-naphthyl, β-naphthyl, β-hydroxy-ethyl, β-acetoxyethyl, cyclopropyl, cyclopentyl, cyclohexyl, cycloheptyl, 2-pyridyl, 2-thiophyl, and 3-indenyl.

The compositions of this invention are prepared by the reaction of hexahalocyclopentadiene with ammonia or a primary amine according to the equation:

$$C_5X_6 + NRH_3 \rightarrow C_5X_5NRH + HCl$$

wherein X is chloro or bromo and R has the value aforesaid. Competing functional groups on R will not prevent the present process from being operative. The amino group will react with hexachlorocyclopentadiene as if no other function group were present save that more hexachlorocyclopentadiene may be required to satisfy the demands of all of the reacting groups present. Even under these unusual conditions, the ultimate product would still be a pentahalocyclopentadienylamine compound falling within the scope of the present invention.

As set forth above, any member of the class of primary amines is suitable for the practice of the process aspect of this invention. Since the definition and extent of the class is well known to those skilled in the art of chemistry, it is unnecessary to illustrate all of the possible varieties of primary amines known and capable of use in the process of the present invention. However, arylamines, aralkylamines, alkarylamines, cycloalkylamines and alkylamines, particular lower-alkylmines containing less than seven carbon atoms and the hydrocarbonaceous carbocyclic amines, such as those of the cycloalkyl and benzene series, are particularly suited for the practice of this invention. Pentachlorocyclopentadiene is preferred amongst the starting pentahalo compounds. Thus compounds of the formula $C_5Cl_5NHR$ wherein R is lower-alkyl, a cycloalkyl, e.g., cyclohexyl, an aralkyl, e.g., benzyl, or an aryl, e.g., phenyl, moiety, constitute the most preferred compositions of this invention.

As used herein, "lower-alkyl" means those alkyl radicals containing 1 to 6 carbon atoms inclusive. Such radicals may be branched or straight chain. Typical illustrations of the lower-alkyl radicals contemplated are methyl, ethyl, propyl, isopropyl, butyl, isobutyl, pentyl and 2,2-dimethylbutyl.

Although cycloalkyl is typified by cyclohexyl and the benzene series by phenyl, other cycloalkyl compounds and substituted benzene or other aromatic radicals which behave in the same general manner are equivalent thereto and fall within the inventive concept.

The process of this invention is preferably effected in the presence of a non-reactive organic solvent. By "non-reactive" is meant that the solvent is unreactive to the reactants and products under the reaction conditions of the present process. Suitable solvents will be recognized by those skilled in the art as including, but not limited to, aliphatic hydrocarbons such as pentane and hexane, aromatic hydrocarbons such as benzene and toluene, ethereal solvent such as diethyl ether, and the like.

The conditions employed in reacting hexachlorocyclopentadiene and the reactant amine or ammonia are not critical. Preferably low temperatures are employed to prevent volatilization of ammonia or lower boiling amines, e.g., as low as −70° C. Similar results may be obtained by working in closed systems under sufficient pressure to maintain the reaction system liquid, e.g., at temperatures as high as 100–150° C. When the reaction is carried out in the presence of a liquid solvent, only slight pressures would be required at ordinary room temperatures. With higher boiling amines, the reaction may be carried out at room temperature or at reflux conditions. Improved yields are often obtained by using molar excess of the amine reactant with respect to hexahalocyclopentadiene or by allowing the reactants to remain in contact with each other for longer periods of time at lower temperatures. The amine product is recovered from the reaction mixture and purified by conventional separation techniques, usually by evaporation of the solvent and recovery of the unreacted hexahalocyclopentadiene which can be reused in the process. The amine product can be isolated and purified by fractional distillation or sublimation under vacuum, chromatographic techniques and/or fractional crystallization.

An advantage of the products of this invention is they can be utilized for fungicidal use in a variety of formulations. For example, the purified or crude products can be combined with biocides or pesticides, including insecticides, such as DDT, methoxychlor, lindane, Aldrin, endrin, DDD, BHC, parathion, Malathion, methyl parathion, lead arsenate, calcium arsenate, rotenone, allethrin, pyrethrum, nicotine, summer oils, dormant oils, dinitroalkylphenols, dinitrocresols, chlordane, heptachlor, insecticidal carbamates and organophosphates, chlorinated terpenes, dimeton, thiophosphates and dithiophosphates such as O,O - dimethyl-S-oxo-1,2,3-benzotriazin-3(4H)-ylmethylphosphorodithioate; (O,O-diethyl-O(2-isopropyl-6-methyl-4-pyrimidinyl)phosphorothioate); the composition marketed under the trademark "Dibrom," etc., miticides such as bis(pentachlorocyclopentadienyl), chlorinated arylsulfonates, chlorinated diarylsulfones and the like, other fungicides such as sulfur, dithiocarbamates and N-trichloromethylthio - 4 - cyclohexene-1,2-dicarboximide to list but a few, to produce formulations having a combined effect.

It is desirable when combining the products of this invention with insecticidal products to include also a class of potentiators or synergists known in the insecticidal art as "knockdown agents." These substances are insecticides which when combined with other insecticides will shorten the time required, or reduce the amounts of the insecticide necessary to effect total immobilization (knockdown) or death of the insect to be controlled. Among the large number of synergists which can be used for this purpose are the organic thiocyanates and the water soluble organophosphates, such as phosdrin, and (2,3,4-methylenedioxyphenoxy)-3,6,9-trioxaundecane, to name but a few.

Another advantage of the inventive compositions is that they can readily be formulated as solids or liquids using solid or liquid solvent vehicles, carriers or extenders.

Suitable diluents are solids or liquids of an inert nature. Illustrative solid diluents include among many others: sawdust, clay, talc, flours, silicas, alkaline earth carbonates, oxides and phosphates, sulfur and the like.

Suitable solvents for liquid formulations include water, ketones, alcohols, aromatic and aliphatic hydrocarbons and petroleum fractions or distillates.

Whether dissolved or dispersed, suspended or emulsified in a liquid or formulated as a dust or powder or some other solid preparation the fungicides of this invention can advantageously contain one or more substances known or referred to variously as modifiers, wetting agents, surface active agents, etc.

This invention is further illustrated by the following examples (all temperatures are given in degrees centigrade):

EXAMPLE 1

Reaction of hexachlorocyclopentadiene and ammonia

Ammonia (17.0 grams, 1.0 mole) and hexachlorocyclopentadiene (27.3 grams, 0.1 mole) were mixed in 100 milliliters of anhydrous ether at −50 degrees. The mixture was permitted to warm to −35 degrees over a period of 4 days. Ether and ammonia were removed at that temperature under vacuum. During this process the color changed from dark blue to red. The red liquid was dissolved in ether, washed with water, and dried over calcium sulfate. Evaporation of the ether gave a red liquid, to which pentane was added. On cooling, 1.4 grams of colorless crystals of a mixture of isomers of the compound $C_5Cl_5NH_2$ melting at 109 degrees, were obtained. The pentane was evaporated and the red liquid vacuum distilled to give 23.1 grams of hexachlorocyclopentadiene. An additional 1 gram of hexachlorocyclopentadiene was obtained from the pot residue (85 percent total recovery).

The product was dissolved in benzene and chromatographed through a 15 centimeter by 15 millimeter silica gel-packed column. Two pentachlorocyclopentadienylamine fractions were obtained. The first was 0.3 gram or a 10 percent yield of colorless crystals melting at 134–136 degrees and the second, 0.9 gram or a 30 percent yield of colorless crystals melting at 111 degrees.

Fraction 1 was vacuum sublimed to give a colorless product melting at 134–136 degrees.

Calc'd for $C_5Cl_5NH_2$: C, 23.67; H, 0.79; N, 5.52; Cl, 70.02. Found: C, 23.21; H, 0.80; N, 5.38; Cl, 69.82.

Fraction 2 was recrystallized to give crystals melting at 111–112 degrees.

Calc'd for $C_5Cl_5NH_2$: C, 23.67; H, 0.79; N, 5.52; Cl, 70.02. Found: C, 23.99; H, 1.02; N, 5.57; Cl, 69.75.

Following the procedure of Example 1, but substituting hexabromocyclopentadiene for the hexachlorocyclopentadiene, there is produced pentabromocyclopentadienylamine.

The product of this example and the corresponding pentabromo compound can be alkylated with a lower-alkyl halide, e.g., methyl iodide, ethyl iodide, n-butyl bromide, employing the usual amine monoalkylating conditions to produce $C_5Cl_5NH$-alkyl and $C_5Br_5NH$-alkyl compounds, e.g., those of Examples 2 and 3.

EXAMPLE 2

Reaction of hexachlorocyclopentadiene and methylamine

To methylamine hydrochloride (21.4 grams, 0.4 mole) dissolved in 100 milliliters of methanol, the potassium methoxide prepared from potassium hydride (22.4 grams, 0.4 mole in 200 milliliters of methanol) was slowly added. The mixture was stirred and then heated for 2 hours. The methylamine thus liberated was distilled into a solution of hexachlorocyclopentadiene (27.3 grams, 0.1 mole) in 100 milliliters of anhydrous ether at −70 degrees.

The reaction flask was kept between −70 and −40 degrees for 3 days and then permitted to warm up to room temperature over a period of 2 days. The ether solution was filtered, washed with water and dried over calcium sulfate. After evaporation of the ether, the residue was vacuum distilled to give 18.4 grams of hexachlorocyclopentadiene. The red residue was subjected to chromatographic separation with the aid of a 45 centimeter by 20 millimeter column packed with acid washed aluminum oxide using benzene as solvent. Three main fractions were obtained. The first consisted of 3.5 grams of unreacted hexachlorocyclopentadiene, the second 1.6 grams of a colorless product, and 0.2 gram of an unidentified red solid melting at 192 degrees after recrystallization from hexane. The total recovery of hexachlorocyclopentadiene was 78 percent.

Recrystallization of the second major fraction from hexane gave 1.6 grams of N-pentachlorocyclopentadienyl-N-methylamine $C_5Cl_5NHCH_3$, melting at 98 degrees.

Dried sclerotia of the fungus *Sclerotium rolfsii*, a plant pathogenic organism, were germinated on moistened paper pads. Some of the pads were moistened with water alone, others with an aqueous dispersion of the product of Example 2 at 100 p.p.m. concentration. In two days, when the pads without chemical showed a heavy growth of the fungus, the chemical-treated pads showed no fungus growth.

Tomato plants innoculated with spores of *Alternaria solani* (the fungus causing Early Blight disease) were sprayed with 0.08 percent aqueous dispersions of the compound $C_5Cl_5NHCH_3 \cdot HCl$, i.e., hydrochloride salt of the product of Example 2. After one week, when similarly inoculated but unsprayed plants were severely spotted by the disease, the symptoms of the disease (leaf spots) were substantially absent on the treated plants.

At 0.025 percent in nutrient agar, $C_5Cl_5NHCH_3 \cdot HCl$ prevented the growth of *Pseudomonas phaseolicola, Erwinia amylovora*, and *Anthomonas phaseoli*, plant pathogenic bacteria which cause disease of apples, pears, and other crops.

EXAMPLE 3

Reaction of hexachlorocyclopentadiene and t-butylamine t-Butylamine (7.3 grams, 0.1 mole), hexachlorocyclopentadiene (27.3 grams, 0.1 mole) and 150 milliliters of hexane were heated at reflux for 5 days. A white solid separated which was filtered, washed with pentane, and then with ether to give 3 grams of t-butylamine hydrochloride. The combined solutions were concentrated and the residual red liquid was purified by chromatography through a 20 centimeter by 30 millimeter column packed with silica gel using benzene followed by 95:5 benzene-methanol. The combined benzene fractions contained 24.7 grams or a 90 percent recovery of unreacted hexachlorocyclopentadiene. The combined benzene-methanol fraction yielded, on evaporation of the solvent, 2.7 grams of a red solid. The red solid was purified by dissolving in hexane and passing through a 15 centimeter by 20 millimeter chromatographic column packed with acid washed aluminum oxide. The combined first three fractions weighing 0.9 gram (2.9 percent conversion, 31 percent yield) were combined and recrystallized from methanol-water. Further fractions containing 1.4 grams of red solid were not characterized. The colorless crystals of N-pentachlorocyclopentadienyl - N-t-butylamine, $C_5Cl_5NHC_4H_9$ obtained melted at 85.5–86.5 degrees.

Calc'd for $C_9Cl_5NH_{10}$: C, 34.89; H, 3.24; N, 4.53; Cl, 57.35. Found: C, 34.79; H, 3.36; N, 4.42; Cl, 57.45.

The compositions of this invention undergo the Diels-Alder condensation with dienophiles in the usual fashion. Typical dienophiles are compounds in which the double bond is activated for addition by the presence of an unsaturated and/or electronegative substituent on one or both of the olefinic carbon atoms. The more reactive dienophiles are carbonyl-containing compounds such as unsaturated esters, ketones, and acids. Maleic anhydride, cyclopentadiene, bicycloheptadiene and benzoquinone are representative dienophiles for reaction with the dienes of this invention.

The compounds of this invention, e.g., the products of Examples 1 and 3, and the corresponding pentabromo compounds, produced by substituting hexabromocyclopentadiene for the hexachlorocyclopentadiene in the process of these examples, can be used as fungicides and bacteriocides in the manner specifically described for the product of Example 2.

Various modifications of this invention will suggest themselves to one skilled in the art and the invention is not to be limited to the above examples.

What is claimed is :
1. A method for controlling fungal growth on plants which comprises applying to the plants a fungicidally effective amount of a pentahalocyclopentadieneamine of the formula $C_5X_5NHR$ wherein X is chloro or bromo and R is hydrogen or an alkyl, hydroxyalkyl, cycloalkyl, aryl, alkaryl or aralkyl group having a molecular weight below 300, in which aryl is carbocyclic and contains 6 to 20 carbon atoms, alkyl contains from 1 to 20 carbon atoms and cycloalkyl contains from 3 to 8 carbon atoms.

2. A fungicidal composition comprising from 0.001 to 0.5 weight percent of a pentahalocyclopentadieneamine of the formula $C_5X_5NHR$ wherein X is chloro or bromo and R is hydrogen or an alkyl, hydroxyalkyl, cycloalkyl, aryl, alkaryl or aralkyl group having a molecular weight below 300, in which aryl is carbocyclic and contains 6 to 20 carbon atoms, alkyl contains from 1 to 20 carbon atoms and cycloalkyl contains from 3 to 8 carbon atoms and an inert diluent therefor.

References Cited

UNITED STATES PATENTS

| 2,548,509 | 4/1951 | Yowell | 167—30 |
| 2,588,997 | 3/1952 | Towne et al. | 167—30 |
| 3,112,345 | 11/1963 | Stansbury et al. | 260—563 |
| 3,136,764 | 6/1964 | McBee | 260—563 X |
| 3,141,907 | 7/1964 | Mark | 260—563 X |
| 3,173,950 | 3/1965 | Buntin | 260—563 |

ALBERT T. MEYERS, Primary Examiner

L. SCHENKMAN, Assistant Examiner

U.S. Cl. X.R.

424—351